(12) United States Patent
Laier

(10) Patent No.: US 12,271,637 B2
(45) Date of Patent: Apr. 8, 2025

(54) HYBRID PHYSICAL/VIRTUAL DATA ADDRESSING WITH GENERATION INDICATORS

(71) Applicant: Dell Products L.P., Round Rock, TX (US)

(72) Inventor: Max Laier, Seattle, WA (US)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 18/366,259

(22) Filed: Aug. 7, 2023

(65) Prior Publication Data

US 2025/0053345 A1    Feb. 13, 2025

(51) Int. Cl.
*G06F 3/06* (2006.01)
(52) U.S. Cl.
CPC .......... *G06F 3/0665* (2013.01); *G06F 3/0604* (2013.01); *G06F 3/0673* (2013.01)
(58) Field of Classification Search
CPC ..... G06F 3/0665; G06F 3/0604; G06F 3/0673
See application file for complete search history.

(56) References Cited

U.S. PATENT DOCUMENTS

| | | | |
|---|---|---|---|
| 2007/0016719 A1* | 1/2007 | Ono | G06F 12/0804 711/E12.04 |
| 2009/0150641 A1* | 6/2009 | Flynn | G06F 12/1081 711/202 |
| 2014/0157085 A1* | 6/2014 | Shalvi | G06F 11/108 714/768 |
| 2019/0034633 A1* | 1/2019 | Seetharamaiah | G06F 9/45558 |
| 2021/0042050 A1* | 2/2021 | Schauer | G06F 3/0647 |
| 2024/0070065 A1* | 2/2024 | Hoang | G06F 12/0292 |

\* cited by examiner

*Primary Examiner* — Gurtej Bansal
(74) *Attorney, Agent, or Firm* — Amin, Turocy & Watson, LLP

(57) ABSTRACT

A method for direct addressing in virtual addressed systems includes obtaining, by a system including a processor and in response to receiving a request to access a data item stored by a storage system, address information for the data item from a data structure. The address information includes a first physical storage address of the storage system, a first generation number associated the first physical storage address in the data structure, and an address redirector. The method also includes accessing, by the system and in response to the first generation number being determined to be different from a second generation number associated with the first physical storage address, the data item at a second physical storage address of the storage system instead of the first physical storage address, the second physical storage address being determined based on the address redirector.

20 Claims, 10 Drawing Sheets

US 12,271,637 B2

HYBRID PHYSICAL/VIRTUAL DATA ADDRESSING WITH GENERATION INDICATORS

BACKGROUND

Virtual addressing, which involves inserting an additional indirection or redirection layer into the address resolution process (e.g., from a logical address to a virtual address to a physical address), can be used to mitigate a number of issues present in large file and/or storage systems. By way of example, a virtual address can be utilized to perform relocation of data without having to traverse the entire file system. Additionally, a single virtual address can be utilized to map to multiple references, e.g., in the case of duplicate files, reducing redundancy. A tradeoff for virtual addressing is that the redirection provided by a virtual address introduces a latency cost associated with resolving the virtual address.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include a memory that stores executable components and a processor that executes the executable components stored in the memory. The executable components can include an address resolution component that obtains storage address information for a data item from a data structure associated with the data item, the storage address information including a first physical address, a first generation indicator associated with the first physical address in the data structure, and an address redirector. The executable components can also include a redirection component that, in response to the first generation indicator being determined to be different from a second generation indicator assigned to a first storage location corresponding to the first physical address, obtains a second physical address based on the address redirector. The executable components can further include a data access component that, in further response to the first generation indicator being determined to be different from the second generation indicator, accesses the data item at a second storage location, corresponding to the second physical address, instead of the first storage location.

In another implementation, a method is described herein. The method can include obtaining, by a system including a processor and in response to receiving a request to access a data item stored by a storage system, address information for the data item from a data structure. The address information can include a first physical storage address of the storage system, a first generation number associated the first physical storage address in the data structure, and an address redirector. The method can additionally include accessing, by the system and in response to the first generation number being determined to be different from a second generation number associated with the first physical storage address, the data item at a second physical storage address of the storage system instead of the first physical storage address, the second physical storage address being determined based on the address redirector.

In an additional implementation, a non-transitory machine-readable medium is described herein that can include instructions that, when executed by a processor, facilitate performance of operations. The operations can include determining, based on a data structure associated with a data item, address information for the data item, the address information including a first physical address, a first generation number associated with the first physical address in the data structure, and a virtual address; and, in response to the first generation number being determined to be different from a second generation number assigned to a storage location given by the first physical address, accessing the data item at a second physical address instead of the first physical address, where the second physical address is associated with the virtual address.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Figure 1:
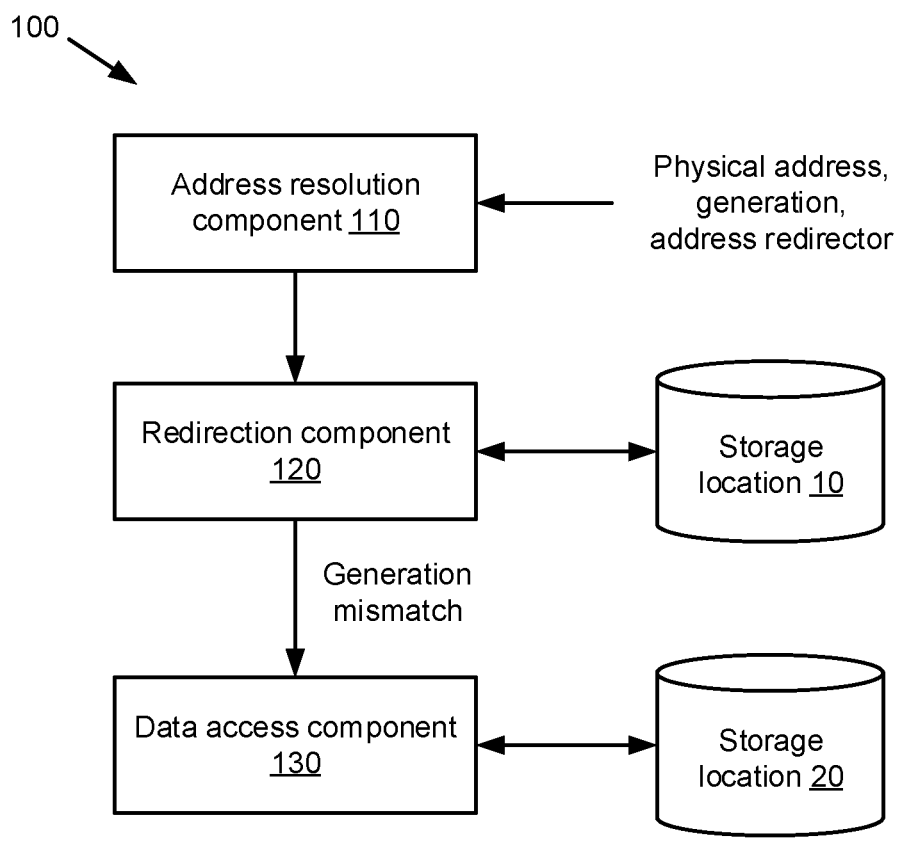
FIGS. 1-2 are block diagrams of a system that facilitates direct addressing in virtual addressed systems in accordance with various implementations described herein.

With reference now to the drawings, FIG. 1 illustrates a block diagram of a system 100 that facilitates direct addressing in virtual addressed systems in accordance with various implementations described herein. System 100 as shown in FIG. 1 includes an address resolution component 110, a redirection component 120, and a data access component 130, each of which can operate as described in further detail below. In an implementation, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 11.

Additionally, it is noted that the functionality of the respective components shown and described herein can be implemented via a single computing device, e.g., a node device operating in a computing cluster and/or another suitable computing device, and/or a combination of devices. For instance, in various implementations, the address resolution component 110 shown in FIG. 1 could be implemented via a first device, the redirection component 120 could be implemented via the first device or a second device, and the data access component 130 could be implemented via the first device, the second device, or a third device. Also or alternatively, the functionality of a single component could be divided among multiple devices in some implementations.

Various implementations described herein are described with reference to a data storage system, e.g., a network attached storage (NAS) system and/or other computing system tasked with storing and/or managing client data. It is noted, however, that similar concepts to those described herein could be applied to any computing system that stores or manages data of any type and/or for any purpose. It is further noted that the following description and the claimed subject matter are not intended to be limited to any specific computing system implementation unless explicitly stated otherwise.

As noted above, virtual addressing provides a layer of indirection that can aid performance in a large file and/or storage system, e.g., by enabling relocation of data without traversing the entire system. For instance, virtual addressing can enable the location of a given piece of data to be updated in an expedited manner, e.g., without updating a file tree or other data structures associated with a file corresponding to the data. This can provide significant benefits, especially in the case in which a piece of data is mapped into multiple different files for duplication and/or other reasons.

As further noted above, however, virtual addressing can incur cost in terms of latency. For instance, a virtual address is generally resolved by looking up the virtual address in a table or other data structure in order to locate the piece of data associated with the virtual address. While direct addressing, e.g., addressing data by its physical storage location, can avoid the latency cost of virtual addressing, direct addressing can incur other costs, e.g., computational cost associated with a full file system scan prior to relocating data.

To the furtherance of the above and/or related ends, various implementations described herein can provide an improved performance tradeoff between virtual and direct addressing by storing both a direct address and a virtual address for a file or other piece of data, e.g., in a primary content tree for that data. Additionally, a direct address as used in this manner can be augmented with a generation indicator, such as a generation number or the like, that enables quick invalidation of a chunk of physical storage. When a reader encounters an invalidated direct address for a data item, it can fall back to the virtual address to find the updated physical address for that data item. The reader can then optionally update the direct address in the primary tree for the data item.

By implementing hybrid direct/virtual addressing as provided herein, various advantages that can result in improved performance of a computing system can be realized. For instance, access time (e.g., in terms of latency or the like) associated with retrieving data stored by a computing system can be reduced, and the amount of this reduction can in some cases scale with the size and/or capacity of the system. Additionally, the amount of write operations performed on a storage disk and/or other data storage devices can be reduced or otherwise optimized, which can in turn extend the operational life of the associated storage devices due to reduced wear or other factors. Other advantages are also possible.

With reference now to the components shown in FIG. 1, the address resolution component 110 can obtain storage address information for a data item (e.g., a file, a portion of a file such as a block, etc.) from a data structure associated with the data item. In some implementations, the data structure can be a B-tree and/or another suitable structure that maps respective portions of the data item, such as blocks or the like, to respective storage addresses associated with an underlying computing system. Examples of a B-tree and/or other structures utilized for address mapping are described in further detail below with respect to FIGS. 3-4. As shown by FIG. 1, the storage address information obtained and/or utilized by the address resolution component 110 can include a physical address corresponding to the data item, a generation number or other indicator associated with that physical address, and an address redirector.

The redirection component 120 shown in system 100, in response to the generation indicator obtained by the address resolution component 110 being determined to be different from a generation indicator that is assigned to a first storage location 10 corresponding to the physical address obtained by the address resolution component 110, can obtain a second physical address based on the address redirector. Stated another way, the redirection component 120 can compare a first generation indicator for a data item as provided by the address resolution component 110 to a second generation indicator that is assigned to the storage location 10 at the physical address provided by the address resolution component 110. If these generation indicators do not match, the redirection component 120 can then obtain a second physical address, e.g., for a second storage location 20, by resolving the address redirector provided by the address resolution component 110.

The data access component 130 shown in system 100, in response to the redirection component 120 identifying a generation indicator mismatch as described above, can then access the data item at the second storage location 20, corresponding to the second physical address obtained by the redirection component 120 from the address redirector as described above, instead of the first storage location 10. Subsequent to the data item being retrieved from the second storage location 20, a data structure corresponding to the data item can optionally be updated to reflect the second storage location 20 as the current location of the data item, e.g., as will be described in further detail below with respect to FIG. 5.

Figure 2:
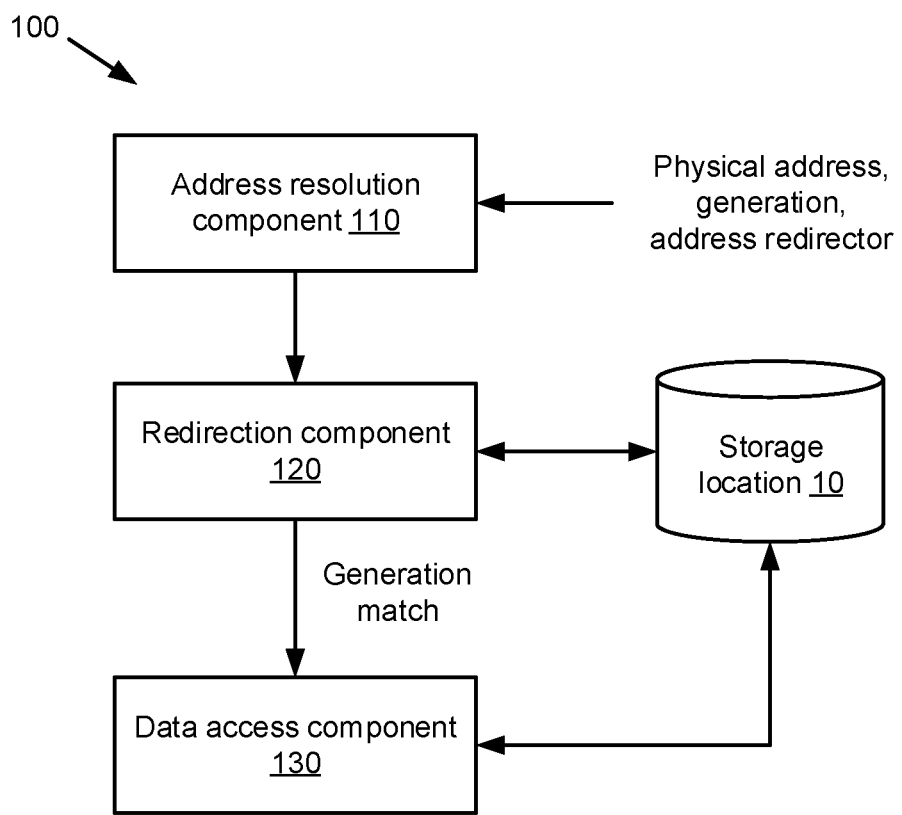

FIG. 2 shows alternative operations that can be performed by system 100 in the event that the generation indicator assigned to the first storage location 10 matches the generation indicator obtained by the address resolution component 110, e.g., from a data structure corresponding to a target data item. Here, instead of resolving the address redirector to identify a second storage location 20 (not shown in FIG. 2), the data access component 130 can respond to a generation match by inferring that the first storage location 10 contains a valid copy of the data item. As a result, the data access component 130 can then access the data item from the first storage location 10 identified by the address resolution component 110.

By augmenting physical location data with a generation number or other indicator as described above, system 100 can quickly invalidate a cached mapping for a given data item, e.g., based on a generation mismatch as described above with respect to FIG. 1. Additionally, if a physical pointer for a data item is determined to be valid, e.g., based on a generation match as described above with respect to FIG. 2, the data item can be accessed without performing virtual address redirection and incurring associated computational costs.

While some implementations described herein utilize a virtual address as an address redirector, it is noted that other address redirector types could also be used. For instance, similar concepts to those described herein for virtual addresses could also be applied to content-addressable storage (CAS) systems. In an implementation that utilizes a CAS system, a CAS-hash can be utilized in addition to and/or instead of a virtual address. A CAS hash is, e.g., a byte hash of a data item that can be utilized by a CAS system to directly identify that data item. A CAS system can provide benefits to de-duplication, e.g., as multiple copies of the same piece of data can hash to the same value, potentially reducing the number of hash keys stored by the system.

In some implementations, hybrid direct/virtual addressing as described above with respect to FIGS. 1-2 can be applied selectively to files and/or other storage objects that benefit most from reduced latency. For example, streaming access files and/or other files with comparatively lenient latency considerations can be addressed using a virtual address only, while randomly accessed database or virtual disk images, or other data items with stricter latency considerations, can have both direct and virtual addresses for improved latency.

Figure 3:
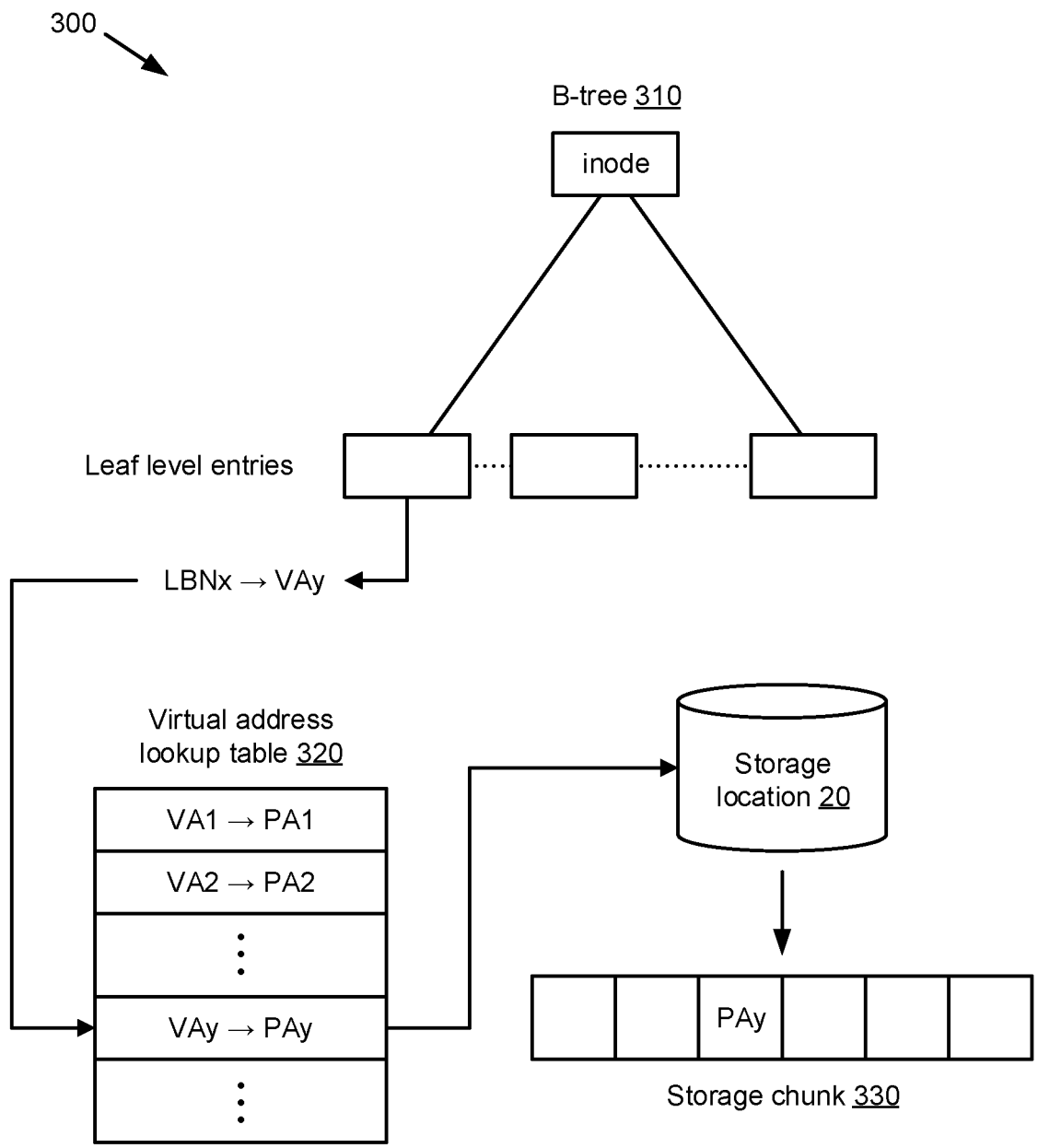
FIGS. 3-4 are diagrams depicting addressing operations that can be performed by a computing system in accordance with various implementations described herein.

With reference next to FIG. 3, a diagram 300 depicting addressing operations that can be performed by a computing system in accordance with various implementations described herein is illustrated. Diagram 300 depicts a data structure, here a B-tree 310, that can be utilized to represent blocks associated with a file or other data object stored by a computing system. While a B-tree 310 is shown in FIG. 3 and described in the context of this example, it is noted that other types of data structures could be used. The B-tree 310, which can also be referred to as a file tree in an implementation in which the B-tree 310 relates to a file, can map byte and/or block offset locations in a given file to respective virtual addresses. A separate layer, here a virtual address lookup table 320, can be used to map virtual addresses to physical locations on a given drive and/or volume where the data can be found.

The top level of the B-tree 310 shown in diagram 300 includes an inode, which can refer to the file and/or object associated with the B-tree 310. The B-tree 310 can include respective entries on multiple tree levels, ending at a bottom, or leaf, level that contains entries that provide mappings that map logical block numbers associated with the file to a virtual address (VA). In the example shown by diagram 300, a logical block number (LBN) LBNx is mapped to a virtual address VAy in the B-tree 310.

A virtual address can, in turn, refer to a data structure such as a virtual address lookup table 320. The virtual address lookup table 320 can be a table or other data structure containing entries, shown as lines in diagram 300, corresponding to respective virtual addresses. Each entry of the virtual address lookup table 320 relates a given virtual address to a physical address, which can point to a specific location on a disk, e.g., a disk corresponding to a storage location 20. In the example shown by diagram 300, the virtual address VAy maps to physical address PAy based on the virtual address lookup table 320. The physical address PAy corresponds to a block or other location within a storage chunk 330 that contains the block corresponding to LBNx.

In an embodiment, the storage chunk 330 can be a partition of the storage location 20 containing one or more blocks into which data can be written. In a system that is optimized for append-only writing (high-capacity/low endurance flash, a shingled magnetic recording (SMR) hard disk drive (HDD), etc.), the physical space can be partitioned into multiple chunks of manageable size, where each chunk can be filled sequentially. Overwriting and/or deleting data can create fragmentation in the chunks, which can be resolved via a garbage collection process as will be described in further detail below with respect to FIGS. 6-8.

Figure 4:
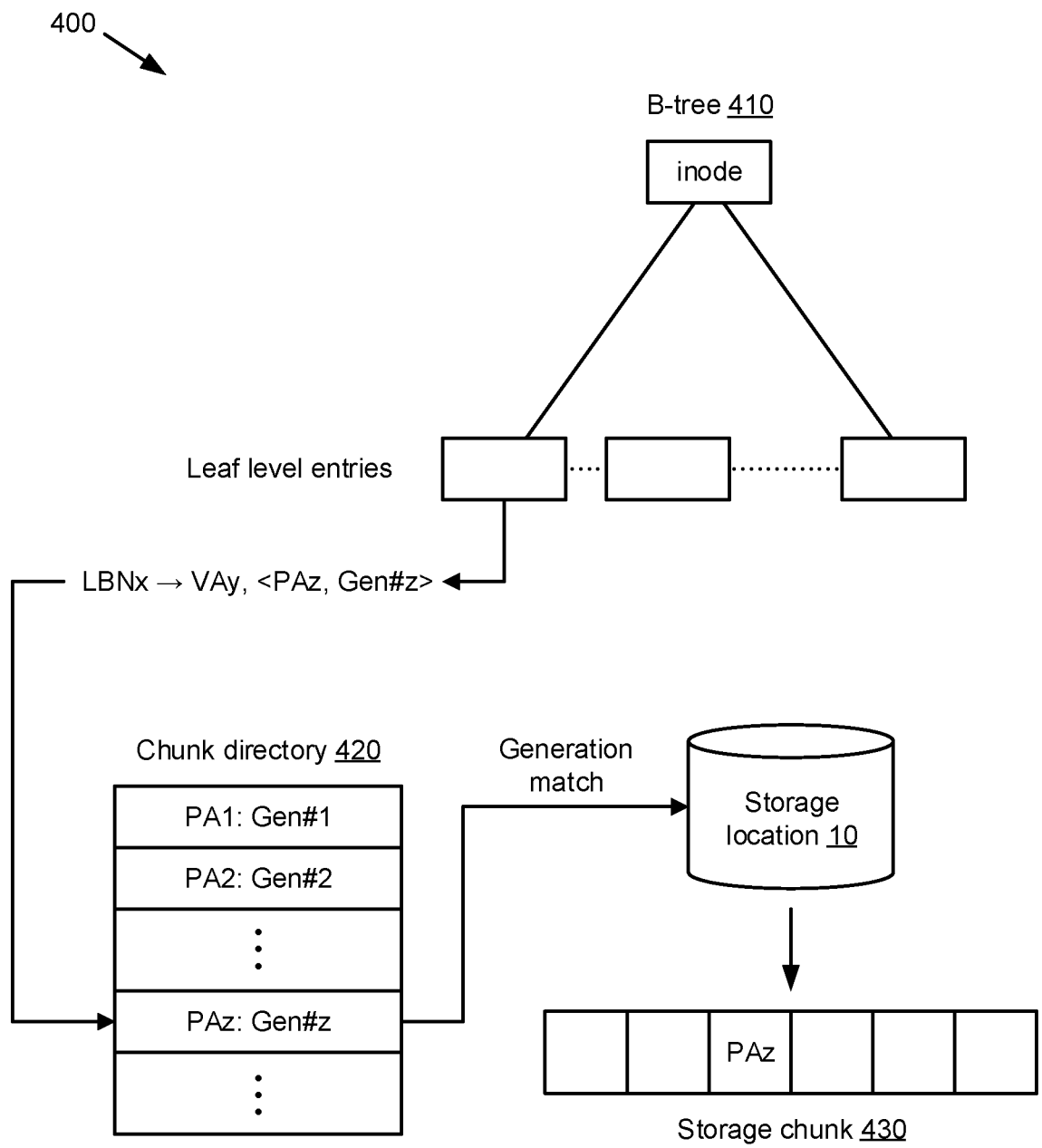

Turning now to FIG. 4, another diagram 400 depicting addressing operations that can be performed by a computing system in accordance with various implementations described herein is illustrated. Diagram 400 depicts a B-tree 410, which can be structured in a similar manner to B-tree 310 as shown in FIG. 3. In contrast to B-tree 310 shown in FIG. 3, the leaf level entries of B-tree 410 contain additional information relating to the physical address of each block represented in the B-tree 410.

In the implementation shown by diagram 400, a primary reference from a file to the underlying storage can be changed to a tuple {<chunkID, generation number, offset>, <virtual address>}. Additionally, a system associated with diagram 400 can maintain a list of active physical chunks and their associated generation numbers, e.g., in a chunk directory 420. Using the chunk directory 420, a read can look at the primary reference and check the <chunkID, generation number> part of the direct address against the chunk directory 420. If the generation number matches, the read can be performed directly. Otherwise, the virtual address can be used to identify the new physical location, e.g., as described above with respect to FIG. 3. In the event of a generation number mismatch resulting in the desired data being retrieved via the virtual address, the reader can choose to update the primary reference, e.g., as will be discussed below with respect to FIG. 5.

In the example shown by diagram 400, a leaf level entry for a data block corresponding to a logical block number LBNx can contain a virtual address VAy in addition to a physical address and its corresponding generation number, i.e., <PAz, Gen #z>. A lookup table such as the chunk directory 420 can be consulted to determine whether the generation number in the leaf level entry matches a generation number assigned to a chunk corresponding to PAZ. If the generation numbers match, the requested data can be directly accessed within the storage chunk 430 containing the data at a storage location 10, e.g., without performing virtual address resolution.

Figure 5:
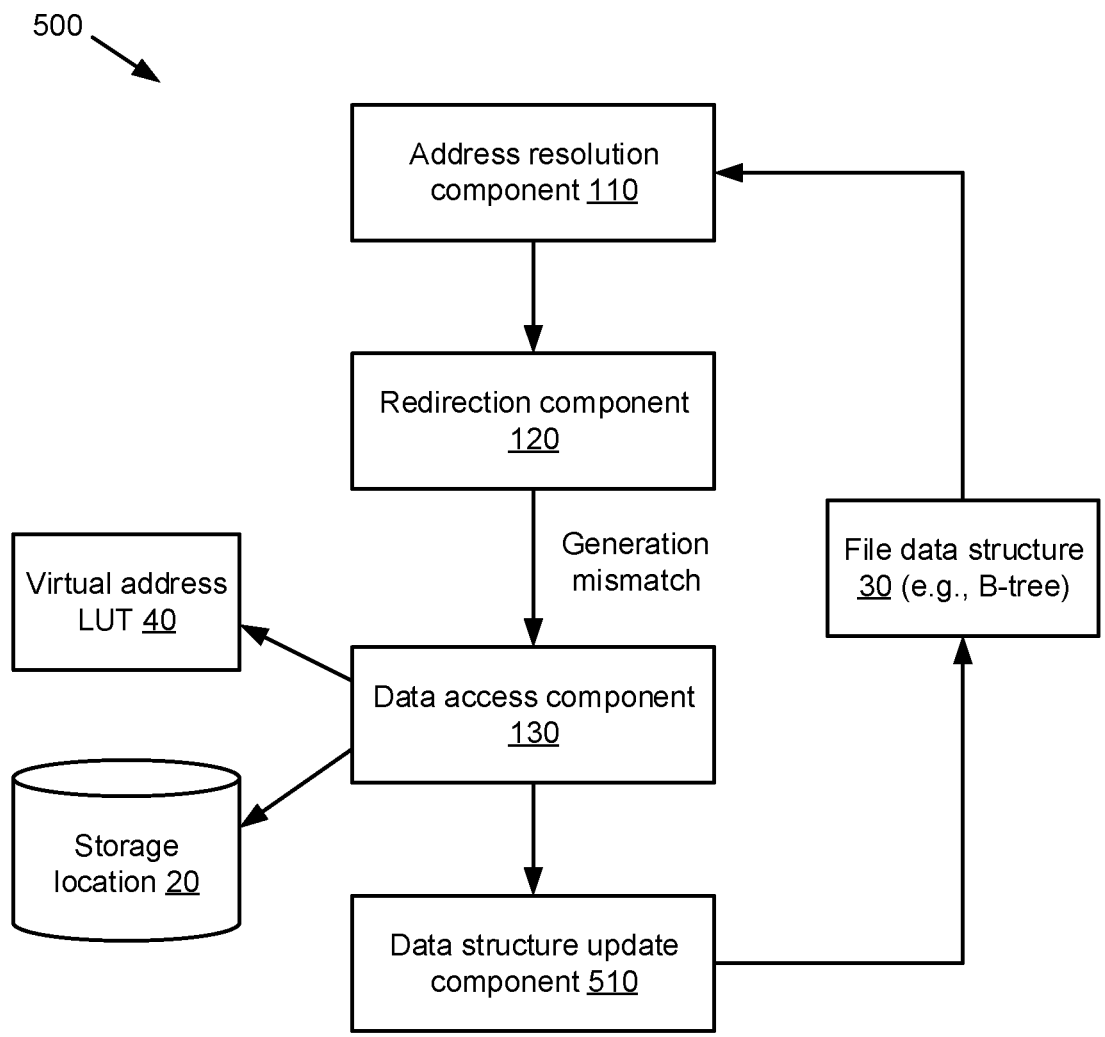
FIG. 5 is a block diagram of a system that facilitates maintaining a data structure associated with a file stored by a computing system in accordance with various implementations described herein.

Referring now to FIG. 5, a block diagram of a system that facilitates maintaining a data structure associated with a file stored by a computing system in accordance with various implementations described herein. Repetitive description of like parts described above with regard to other implementations is omitted for brevity. System 500 as shown in FIG. 5 includes an address resolution component 110, redirection component 120, and data access component 130 that can function as described above with respect to FIGS. 1-2. As further shown in FIG. 5, in the event that a generation number associated with a requested data item does not match a generation number for the physical address associated with that data item, the data access component can resolve a virtual address for the data item via a virtual address lookup table 40, e.g., to locate the data item at a storage location 20 corresponding to the virtual address.

As further shown in FIG. 5, system 500 includes a data structure update component 510 that, in response to the data access component 130 accessing the data item at the storage location 20 (e.g., due to a generation number mismatch), can update a file data structure 30 corresponding to the data item to reflect its physical address. In an implementation, the data structure update component 510 can update the file data structure 30 by replacing a physical address stored in the file data structure 30 with the updated physical address. Additionally, the data structure update component 510 can update a generation number stored by the file data structure 30, e.g., in a <physical location, generation number> pair as described above with respect to FIG. 4, with a generation number corresponding to the updated location of the data item.

In some implementations, the data structure update component 510 can determine whether or not to update the file data structure 30 based on various criteria. For instance, in an implementation in which the file data structure 30 is a B-tree (e.g., a B-tree 310/410), the data structure update component 510 can elect to update the B-tree based on an amount of contention on the B-tree, as multiple contending updates to the B-tree can increase latency beyond an amount deemed by the data structure update component 510 to be desirable.

Figure 6:
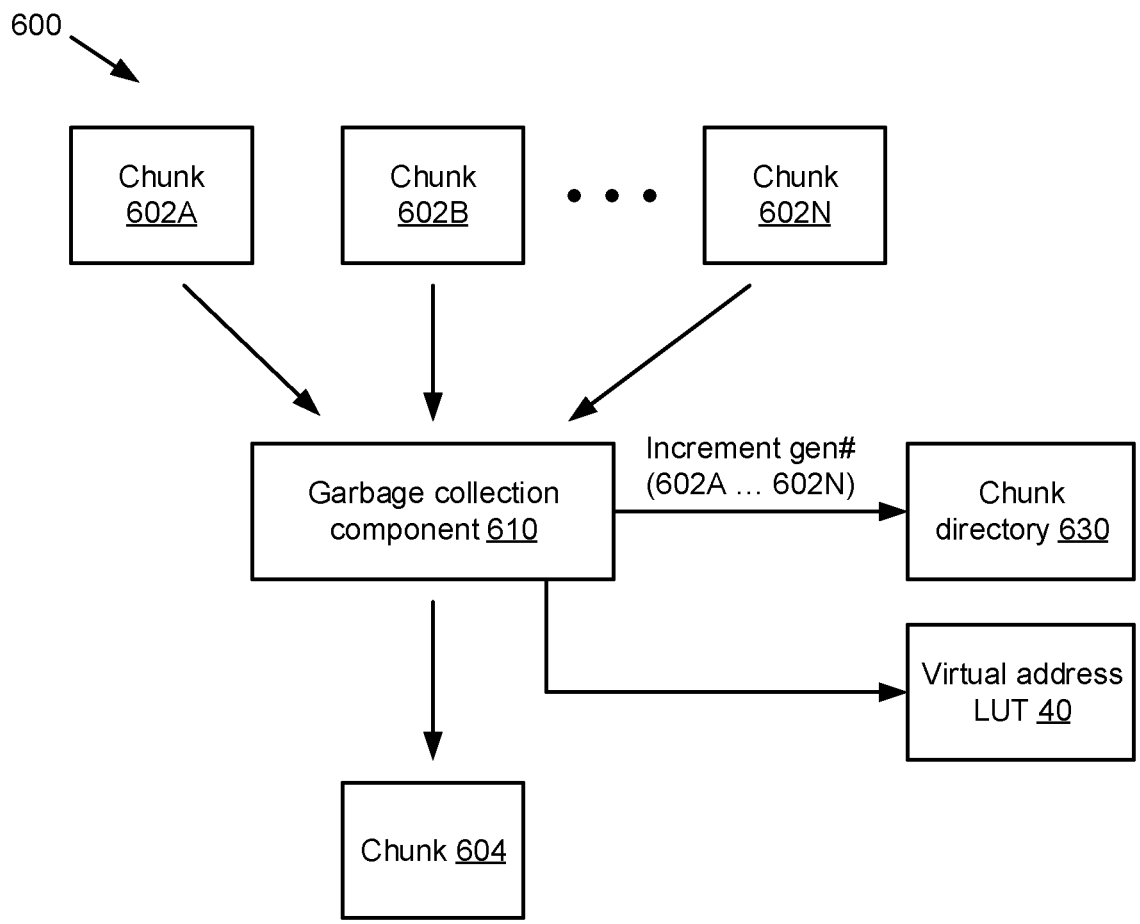
FIGS. 6-7 are diagrams depicting respective garbage collection operations that can be performed in accordance with various implementations described herein.

Referring now to FIG. 6, diagram 600 illustrates garbage collection operations that can be performed in a computing architecture as described herein. As noted above, data corresponding to a given file can be stored to respective storage locations non-contiguously due to the nature of bulk storage. For instance, data can be written with temporal locality, e.g., such that data written closely in time will be stored to the same location. However, in the event that a large file is written over time, the data that makes up the file can be spread out over physical space, e.g., among respective chunks 602A-602N as shown in FIG. 6. A data structure, such as a B-tree as described above, can be used to locate the blocks that make up a file written in this manner.

Diagram 600 depicts a garbage collection component that can move data from chunks 602A-602N at which the data is originally stored to a new, compact chunk 604, in order to free the original chunks 602A-602N for new writes. It is noted that the naming convention utilized for chunks 602A-602N is not intended to imply any specific number of chunks 602, as any suitable number of chunks 602 could be processed by the garbage collection component 610. By way of example, the garbage collection component 610 can copy a data item (e.g., a block of a file) from a first storage location, e.g., a chunk 602, to a second storage location, e.g., chunk 604. In response to the data item being successfully copied, the garbage collection component 610 can additionally modify an address redirector associated with the data item (e.g., a virtual address stored in a virtual address lookup table 40, etc.) from indicating the original chunk 602 to indicating the new chunk 604. Additionally, the garbage collection component 610, in further response to successfully copying the data item, can increment generation numbers corresponding to the old chunks 602A-602N, e.g., in a chunk directory 630, to invalidate references to the contents of the old chunks 602A-602N.

In an implementation, garbage collection can be performed by the garbage collection component 610 as follows:

1) Copy valid content into a free, compact chunk.

2) Update virtual addresses that reference the valid content to point to the new location, e.g., by modifying a corresponding entry of the virtual address lookup table 40 to reference the new location.

3) Update (e.g., increment) the generation number of the old chunk.

Figure 7:
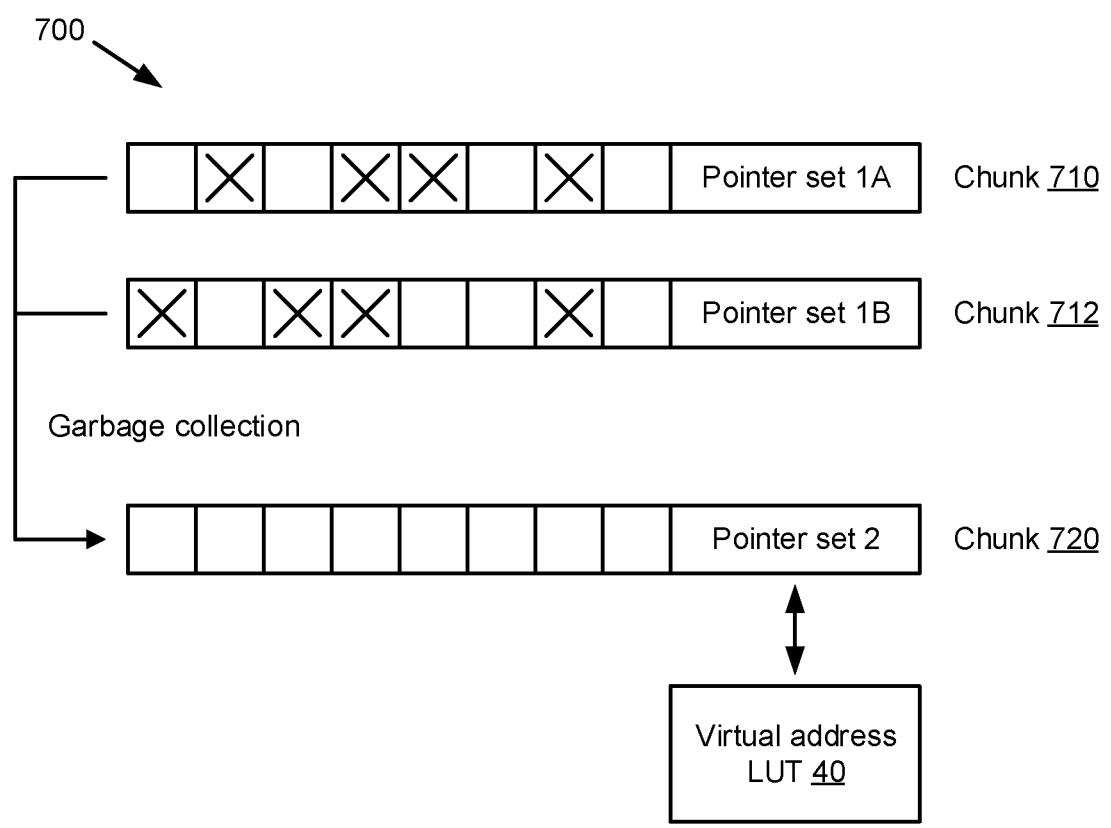

Diagram 700 in FIG. 7 illustrates an example of garbage collection in which the content of two chunks 710, 712 are merged into a new chunk 720. While diagram 700 illustrates an example in which two chunks 710, 712 are merged, it is noted that any suitable number of chunks could be merged using similar techniques. In diagram 700, invalid blocks are indicated via crossed out squares, and valid blocks are indicated via blank squares. Blocks can become invalid as shown in diagram 700 by, e.g., deleting or overwriting the content associated with the blocks. As additionally shown in diagram 700, each of the chunks 710, 712 includes a pointer set that identifies the virtual addresses, or other address redirectors, that are responsible for the respective blocks of the chunks 710, 712.

In the example shown in diagram 700, a new chunk 720 can be allocated, and the valid data in chunks 710, 712 can be copied into the new chunk 720. Additionally, respective pointers can be written to the chunk 720, and/or a structure associated with the chunk such as a chunk directory, to update the location of the blocks forming the new chunk 720 in a virtual address lookup table 40. Upon successfully copying the blocks to the new chunk 720 and updating the corresponding virtual address information, chunks 710, 712 can be invalidated (e.g., by incrementing the generation number corresponding to chunks 710, 712 in a chunk directory) and freed for subsequent writes.

Figure 8:
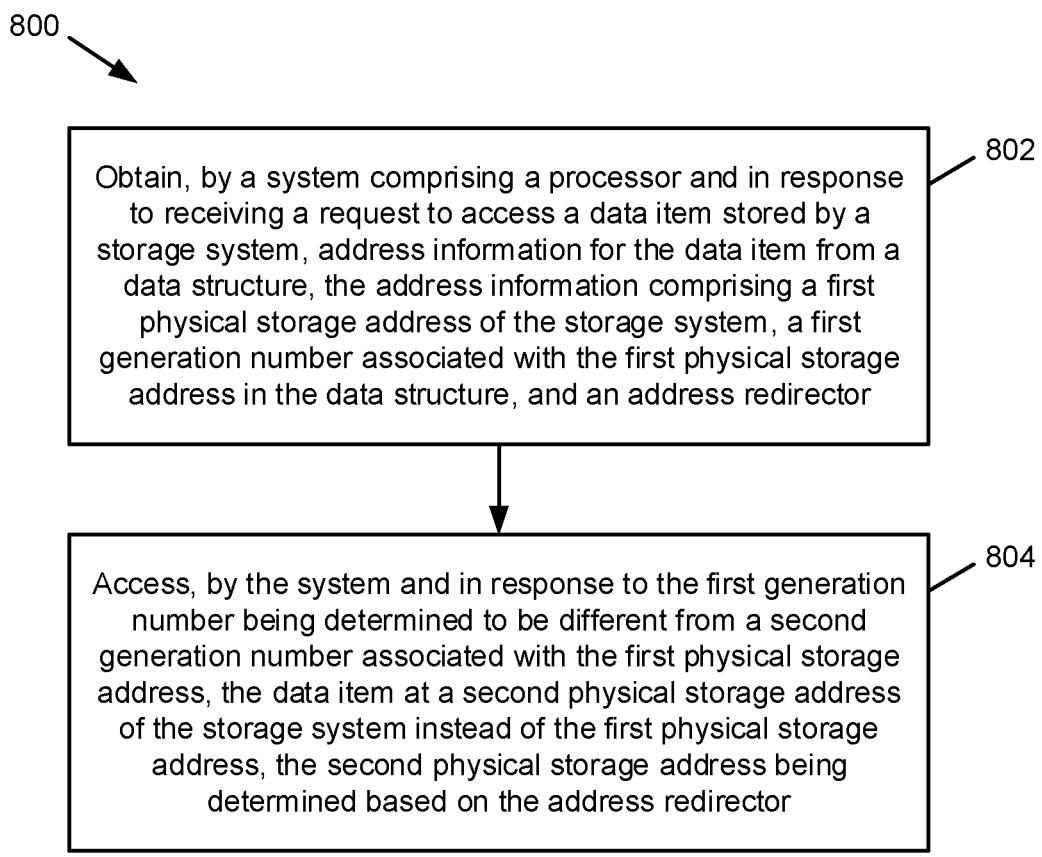
FIG. 8 is a flow diagram of a method that facilitates direct addressing in virtual addressed systems in accordance with various implementations described herein.

Turning now to FIG. 8, a flow diagram of a method 800 that facilitates direct addressing in virtual addressed systems is illustrated. At 802, a system comprising a processor can, in response to receiving a request to access a data item stored by a storage system, obtain (e.g., via an address resolution component 110) address information for the data item from a data structure (e.g., a B-tree corresponding to the data item). The address information obtained at 802 can include a first physical storage address of the storage system, a first generation number associated with the first physical storage address in the data structure, and an address redirector (e.g., a virtual address).

At 804, in response to the first generation number obtained at 802 being determined (e.g., by a redirection component 120) to be different from a second generation number associated with the first physical storage address, the system can access (e.g., via a data access component 130) the data item at a second physical storage address of the storage system instead of the first physical storage address obtained at 802. The second physical storage address can be determined based on the address redirector obtained at 802.

Figure 9:
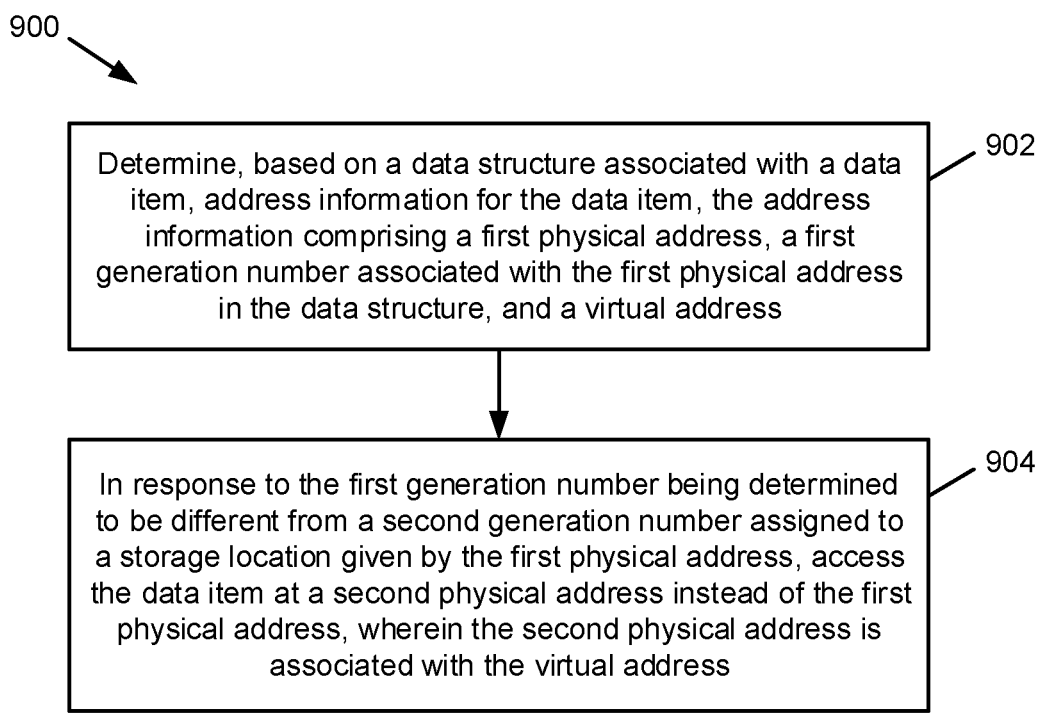
FIG. 9 is a flow diagram depicting respective operations for direct addressing in virtual addressed systems that can performed by a processor in accordance with various implementations described herein.

Referring next to FIG. 9, a flow diagram of a method 900 that can be performed by a processor, e.g., based on machine-executable instructions stored on a non-transitory machine-readable medium, is illustrated. An example of a computer architecture, including a processor and non-transitory media, that can be utilized to implement method 900 is described below with respect to FIG. 10.

Method 900 can begin at 902, in which the processor can determine, based on a data structure associated with a data item, address information for the data item. The address information can include a first physical address, a first generation number associated with the first physical address in the data structure, and a virtual address.

At 904, the processor can, in response to the first generation number being determined to be different from a second generation number assigned to a storage location given by the first physical address, access the data item at a second physical address instead of the first physical address. The second physical address can be associated with the virtual address.

FIGS. 8-9 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 10:
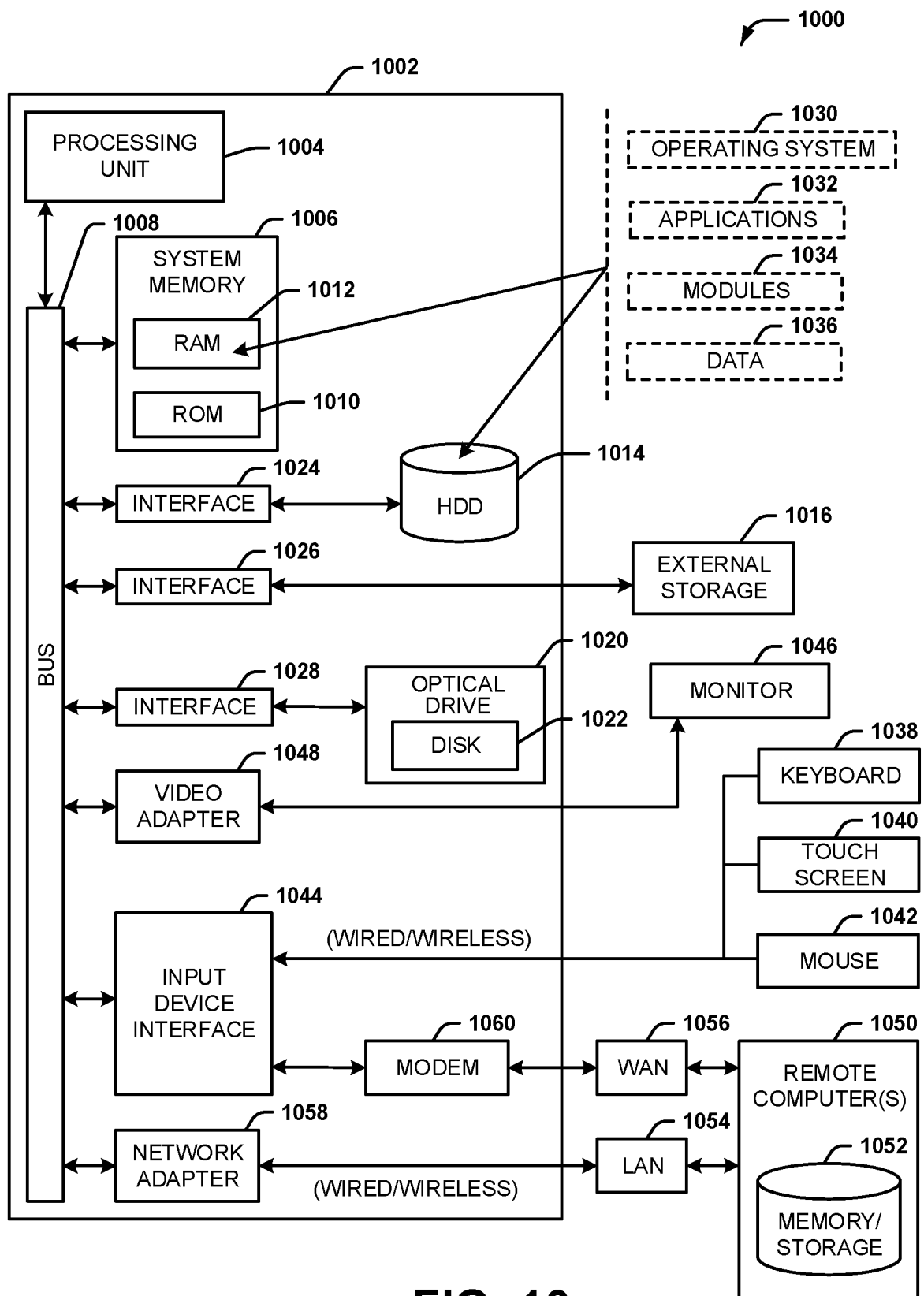
FIG. 10 is a diagram of an example computing environment in which various implementations described herein can function.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD), a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s)

1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a memory that stores executable components; and
a processor that executes the executable components stored in the memory, wherein the executable components comprise:
an address resolution component that obtains storage address information for a data item from a tree structure associated with the data item, the storage address information comprising a first physical address, a first generation indicator associated with the first physical address in the tree structure, and an address redirector;
a redirection component that obtains a second generation indicator from an entry, corresponding to the first physical address, of a data structure that is distinct from, and not part of, the tree structure and, in response to the first generation indicator being determined to be different from the second generation indicator, obtains a second physical address based on the address redirector; and
a data access component that, in further response to the first generation indicator being determined to be different from the second generation indicator, accesses the data item at a second storage location, corresponding to the second physical address, instead of a first storage location, corresponding to the first physical address.

2. The system of claim 1, wherein the data access component, in response to the first generation indicator being determined to match the second generation indicator, accesses the data item at the first storage location.

3. The system of claim 1, wherein the address redirector comprises a virtual address.

4. The system of claim 3, wherein the entry of the data structure is a first entry, and wherein the redirection component obtains the second physical address from a second entry of a lookup table, the second entry of the lookup table corresponding to the virtual address.

5. The system of claim 1, wherein the address redirector comprises a hash of the data item.

6. The system of claim 1, wherein the tree structure is a B-tree.

7. The system of claim 1, wherein the executable components further comprise:
a data structure update component that, in response to the data access component accessing the data item at the second storage location, replaces the first physical address in the tree structure with the second physical address and replaces the first generation indicator associated with the first physical address in the tree structure with the second generation indicator.

8. The system of claim 1, wherein the executable components further comprise:
a garbage collection component that copies the data item from the first storage location to the second storage location and, in response to the data item being successfully copied to the second storage location, modifies the address redirector from indicating the first storage location to indicating the second storage location.

9. The system of claim 8, wherein the garbage collection component, in further response to the data item being successfully copied to the second storage location, assigns the second generation indicator to the first storage location.

10. The method of claim 1, wherein the system maintains a group of tree structures, comprising the tree structure, and wherein respective ones of the group of tree structures are associated with respective ones of a group of data items, comprising the data item.

11. A method, comprising:
obtaining, by a system comprising a processor and in response to receiving a request to access a data item stored by a storage system, address information for the data item from a tree structure associated with the data item, the address information comprising a first physical storage address of the storage system, a first generation number associated with the first physical storage address in the tree structure, and an address redirector;
obtaining, by the system, a second generation number from an entry, corresponding to the first physical storage address, of a data structure that is distinct from, and not part of, the tree structure; and
accessing, by the system and in response to the first generation number being determined to be different from the second generation number, the data item at a second physical storage address of the storage system instead of the first physical storage address, the second physical storage address being determined based on the address redirector.

12. The method of claim 11, further comprising:
accessing, by the system and in response to the first generation number being determined to be equal to the second generation number, the data item at the first physical storage address.

13. The method of claim 11, wherein the address redirector comprises a virtual address, wherein the entry of the data structure is a first entry, and wherein the method further comprises:
obtaining, by the system, the second physical storage address from a second entry of a lookup table, the second entry of the lookup table corresponding to the virtual address.

14. The method of claim 11, further comprising:
in response to the accessing of the data item at the second physical storage address:
replacing, by the system, the first physical storage address in the tree structure with the second physical storage address; and
replacing, by the system, the first generation number associated with the first physical storage address in the tree structure with the second generation number.

15. The method of claim 11, further comprising:
copying, by the system, the data item from the first physical storage address to the second physical storage address; and
modifying, by the system and in response to the copying, the address redirector to redirect to the second physical storage address instead of the first physical storage address.

16. A non-transitory machine-readable medium comprising computer executable instructions that, when executed by a processor, facilitate performance of operations, the operations comprising:
determining, based on a tree structure associated with a data item, address information for the data item, the address information comprising a first physical address, a first generation number associated with the first physical address in the tree structure, and a virtual address;
obtaining a second generation number from an entry, corresponding to the first physical address, of a data structure that is distinct from, and not part of, the tree structure; and
in response to the first generation number being determined to be different from the second generation number, accessing the data item at a second physical address instead of the first physical address, wherein the second physical address is associated with the virtual address.

17. The non-transitory machine-readable medium of claim 16, wherein the operations further comprise:
in response to the first generation number being determined to be equal to the second generation number, accessing the data item at the first physical address.

18. The non-transitory machine-readable medium of claim 16, wherein the operations further comprise:
in response to the accessing of the data item at the second physical address, replacing the first physical address in the tree structure with the second physical address; and
in further response to the accessing of the data item at the second physical address, replacing the first generation number associated with the first physical address in the tree structure with the second generation number.

19. The non-transitory machine-readable medium of claim 16, wherein the data structure is a first data structure, wherein the entry of the first data structure is a first entry, and wherein the operations further comprise:
obtaining the second physical address from a second entry of a second data structure, the second entry of the second data structure corresponding to the virtual address.

20. The non-transitory machine-readable medium of claim 19, wherein the operations further comprise:
copying the data item from a first storage location given by the first physical address to a second storage location associated with the second physical address; and
modifying, in response to the copying, the second entry of the second data structure to include the second physical address and to exclude the first physical address.

* * * * *